(12) United States Patent
Reynolds et al.

(10) Patent No.: US 12,141,903 B1
(45) Date of Patent: Nov. 12, 2024

(54) DYNAMIC VIDEO CONFERENCE INTERFACE OPTIMIZATION

(71) Applicant: INTERNATIONAL BUSINESS MACHINES CORPORATION, Armonk, NY (US)

(72) Inventors: Spencer Thomas Reynolds, Austin, TX (US); Zachary A. Silverstein, Georgetown, TX (US); Jacob Ryan Jepperson, St. Paul, MN (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/330,954

(22) Filed: Jun. 7, 2023

(51) Int. Cl.
| | |
|---|---|
| *G06T 11/60* | (2006.01) |
| *H04L 65/403* | (2022.01) |
| *H04L 67/02* | (2022.01) |
| *G06Q 10/10* | (2023.01) |
| *G06Q 10/1093* | (2023.01) |
| *H04L 12/18* | (2006.01) |
| *H04N 7/15* | (2006.01) |

(52) U.S. Cl.
CPC ............ *G06T 11/60* (2013.01); *H04L 65/403* (2013.01); *H04L 67/02* (2013.01); *G06Q 10/10* (2013.01); *G06Q 10/1095* (2013.01); *G06T 2200/24* (2013.01); *H04L 12/1818* (2013.01); *H04L 12/1822* (2013.01); *H04N 7/15* (2013.01); *H04N 7/157* (2013.01)

(58) Field of Classification Search
None
See application file for complete search history.

(56) References Cited

U.S. PATENT DOCUMENTS

| | | | | |
|---|---|---|---|---|
| 9,167,009 | B2 * | 10/2015 | Bastide | H04L 65/403 |
| 9,992,245 | B2 * | 6/2018 | DeLuca | G06Q 10/103 |
| 10,581,788 | B2 | 3/2020 | Morrison | |
| 10,805,365 | B2 * | 10/2020 | Bader-Natal | H04L 65/4015 |
| 11,122,240 | B2 * | 9/2021 | Peters | G06V 20/41 |
| 11,165,597 | B1 * | 11/2021 | Matsuguma | H04L 12/1822 |
| 11,405,587 | B1 * | 8/2022 | Segal | G06F 3/04845 |
| 11,516,036 | B1 * | 11/2022 | Harathi | H04L 12/1827 |
| 11,621,979 | B1 * | 4/2023 | Slotznick | H04L 65/403 |
| | | | | 348/14.07 |

(Continued)

OTHER PUBLICATIONS

Apple, "Use Group FaceTime On Your iPhone or iPad", Apple—Support, [accessed Mar. 6, 2023], 4 pgs., Retrieved from the Internet: <https://support.apple.com/en-us/HT209022>.

(Continued)

*Primary Examiner* — Lashonda Jacobs-Burton
(74) *Attorney, Agent, or Firm* — Elliot J. Shine

(57) ABSTRACT

A method, computer system, and a computer program product for video conference optimization is provided. The present invention may include accessing data for a scheduled web conference. The present invention may include generating a visual display template for each of a plurality of participants of the scheduled web conference. The present invention may include monitoring the scheduled web conference. The present invention may include adjusting the visual display template for at least a portion of the plurality of participants during the scheduled web conference.

18 Claims, 2 Drawing Sheets

(56) References Cited

U.S. PATENT DOCUMENTS

| | | | |
|---|---|---|---|
| 11,627,006 B1* | 4/2023 | Chew | H04L 51/02 |
| | | | 704/275 |
| 11,659,138 B1* | 5/2023 | Segal | H04N 21/812 |
| | | | 348/14.08 |
| 11,665,284 B2* | 5/2023 | Jorasch | H04L 12/1822 |
| | | | 709/204 |
| 11,711,228 B1* | 7/2023 | Zacek | H04L 12/1822 |
| | | | 709/204 |
| 11,729,009 B1* | 8/2023 | Religa | H04L 65/4015 |
| | | | 709/204 |
| 11,741,664 B1* | 8/2023 | Swanson | H04N 7/157 |
| | | | 345/419 |
| 11,776,227 B1* | 10/2023 | Krol | G06V 20/41 |
| | | | 345/419 |
| 12,095,580 B2* | 9/2024 | Ramoutar | H04L 12/1822 |
| 2011/0320958 A1* | 12/2011 | Kashi | G06Q 10/1095 |
| | | | 715/751 |
| 2013/0294594 A1 | 11/2013 | Chervets | |
| 2013/0305166 A1* | 11/2013 | Bastide | H04L 65/4038 |
| | | | 715/753 |
| 2014/0006495 A1* | 1/2014 | Adderly | H04L 65/403 |
| | | | 709/204 |
| 2015/0074556 A1* | 3/2015 | Bader-Natal | H04L 12/1813 |
| | | | 715/753 |
| 2015/0334243 A1* | 11/2015 | Hu | H04L 63/08 |
| | | | 379/202.01 |
| 2016/0234269 A1* | 8/2016 | Huang | H04L 65/4038 |
| 2018/0012191 A1* | 1/2018 | Rosenberg | H04L 67/01 |
| 2018/0039951 A1* | 2/2018 | Wynn | G06Q 10/1095 |
| 2018/0046957 A1* | 2/2018 | Yaari | G06Q 10/1095 |
| 2018/0146160 A1* | 5/2018 | Kang | H04N 7/15 |
| 2019/0004639 A1 | 1/2019 | Faulkner | |
| 2020/0111046 A1* | 4/2020 | Ball-Marian | G06Q 10/063116 |
| 2021/0076002 A1* | 3/2021 | Peters | H04N 7/152 |
| 2021/0099488 A1* | 4/2021 | Schrager | H04L 63/20 |
| 2021/0117929 A1* | 4/2021 | Lewbel | G06Q 10/1095 |
| 2021/0176429 A1* | 6/2021 | Peters | G06V 20/41 |
| 2021/0400142 A1* | 12/2021 | Jorasch | H04L 65/1069 |
| 2022/0150083 A1 | 5/2022 | Faulkner | |
| 2023/0033104 A1* | 2/2023 | Geddes | H04L 65/403 |
| 2023/0100862 A1* | 3/2023 | Varghese | H04L 65/1089 |
| | | | 345/2.2 |
| 2023/0208898 A1* | 6/2023 | Deng | G06Q 10/06393 |
| | | | 709/204 |
| 2023/0230045 A1* | 7/2023 | Berndtsson | G06Q 10/1095 |
| | | | 705/7.19 |
| 2023/0236713 A1* | 7/2023 | Tang | G06T 7/20 |
| | | | 715/753 |
| 2023/0260519 A1* | 8/2023 | Medalion | G10L 17/00 |
| | | | 704/232 |
| 2023/0261890 A1* | 8/2023 | Religa | G06Q 10/10 |
| | | | 709/204 |
| 2023/0308303 A1* | 9/2023 | Jorasch | H04L 12/1822 |
| 2023/0308500 A1* | 9/2023 | Breedvelt-Schouten | |
| | | | H04L 65/403 |
| 2023/0336681 A1* | 10/2023 | Zhang | H04L 65/765 |
| 2023/0351123 A1* | 11/2023 | Chollampatt Muhammed Ashraf | G10L 15/22 |

OTHER PUBLICATIONS

Fortune, "Video Conferencing Market Size, Share, Trends & Growth [2029]", Fortune Business Insights, [accessed Mar. 6, 2023], 10 pgs., Retrieved from the Internet: <https://www.fortunebusinessinsights.com/industry-reports/video-conferencing-market-100293>.

IBM, "Streaming Video Platform & Hosting Services", IBM, Watson Media, [accessed Mar. 6, 2023], 5 pgs., Retrieved from the Internet: <https://video.ibm.com/>.

The Guardian, "Can Virtual Meeting Spaces Save US All from Zoom Fatigue?", The Guardian —Technology, [accessed Mar. 6, 2023], 14 pgs., Retrieved from the Internet: <https://www.theguardian.com/technology/2021/may/08/work-can-virtual-meeting-spaces-save-us-all-from-zoom-fatigue>.

Yigitbas, "Virtual Reality in University Teaching: Experiences from a Computer Science Seminar", arXiv:2211.12221v1 [cs.HC], Nov. 22, 2022, 24 pgs.

* cited by examiner

DYNAMIC VIDEO CONFERENCE INTERFACE OPTIMIZATION

BACKGROUND

The present invention relates generally to the field of computing, and more particularly to video conference optimization.

Web conferencing may be a term used for various types of online conferencing and collaborative services including at least webinars, webcasts, and web meetings. Web conferencing may be used in social gatherings, live discussions, professional meetings, training events, lectures, and/or presentations, amongst other things. Depending on the technology being used, participants may speak to and listen to audio over standard telephone lines or via computer microphones and speakers and may be able to see those participants in real time. While different interfaces may utilize specific features, most solutions display the faces of the individuals participating and highlight and/or center the frame of the individual who is actively speaking.

Current methods for modifying the video interface during web conferencing may highlight the person actively speaking, however, there may be additional opportunities to leverage contextual data to create an optimized and/or dynamic interface which may highlight specific participants and not just the active speaker.

SUMMARY

Embodiments of the present invention disclose a method, computer system, and a computer program product for video conference optimization. The present invention may include accessing data for a scheduled web conference. The present invention may include generating a visual display template for each of a plurality of participants of the scheduled web conference. The present invention may include monitoring the scheduled web conference. The present invention may include adjusting the visual display template for at least a portion of the plurality of participants during the scheduled web conference.

In another embodiment, the method may include storing completed web conference data in a knowledge corpus and retraining a time series deep learning model based on the completed web conference data.

In a further embodiment, the method may include identifying transitions within an agenda to be used in the adjusting of the visual display template.

In addition to a method, additional embodiments are directed to a computer system and a computer program product for video conference optimization by leveraging contextual data to generate a visual display template which may be dynamically adjusted to highlight specific participants.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
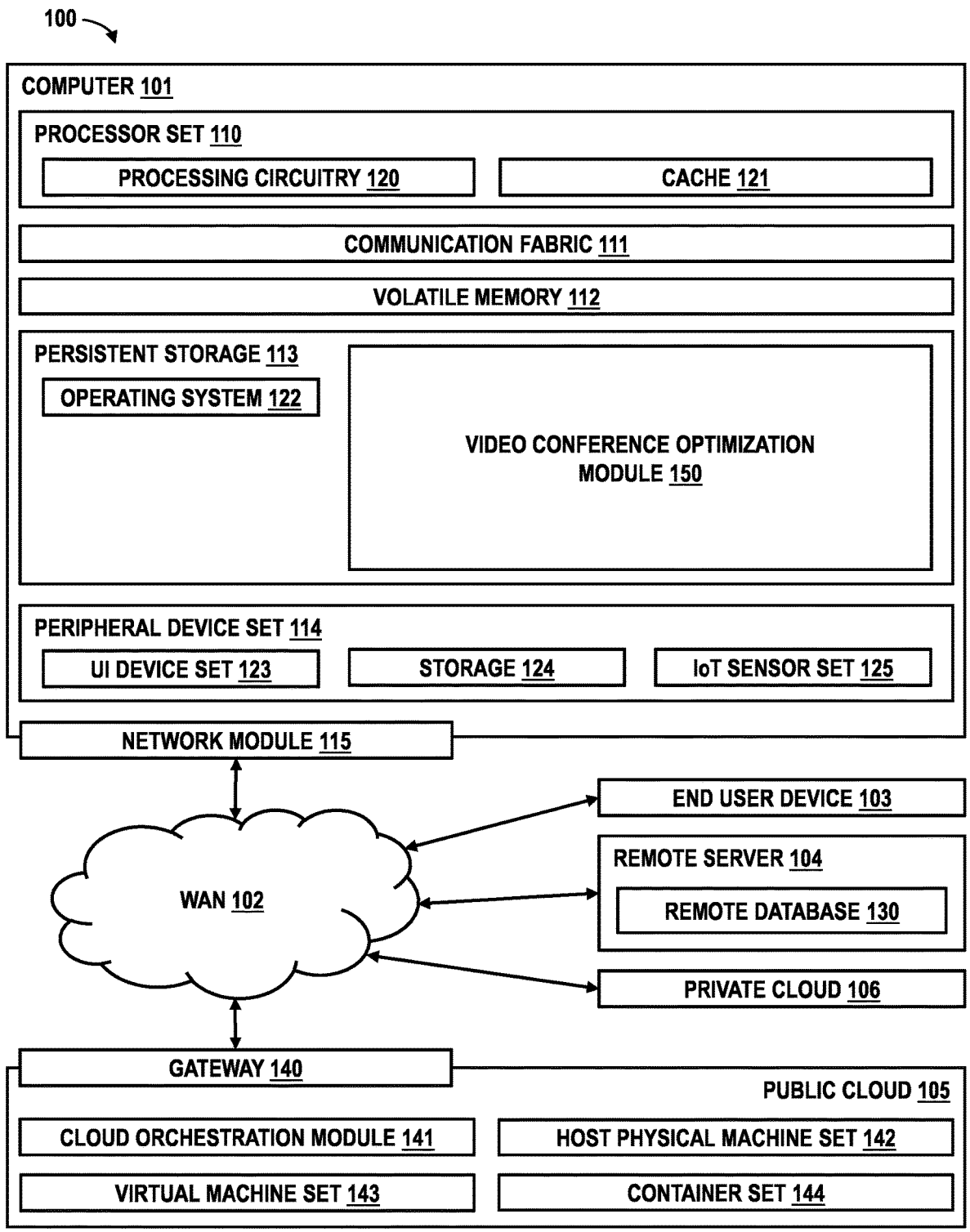
FIG. 1 depicts a block diagram of an exemplary computing environment according to at least one embodiment.

The following described exemplary embodiments provide a system, method and program product for video conference optimization module. As such, the present embodiment has the capacity to improve the technical field of web conference by leveraging contextual data to generate a visual display template which may be dynamically adjusted to highlight specific participants. More specifically, the present invention may include accessing data for a scheduled web conference. The present invention may include generating a visual display template for each of a plurality of participants of the scheduled web conference. The present invention may include monitoring the scheduled web conference. The present invention may include adjusting the visual display template for at least a portion of the plurality of participants during the scheduled web conference.

As described previously, web conferencing may be a term used for various types of online conferencing and collaborative services including at least webinars, webcasts, and web meetings. Web conferencing may be used in social gatherings, live discussions, professional meetings, training events, lectures, and/or presentations, amongst other things. Depending on the technology being used, participants may speak to and listen to audio over standard telephone lines or via computer microphones and speakers and may be able to see those participants in real time. While different interfaces may utilize specific features, most solutions display the faces of the individuals participating and highlight and/or center the frame of the individual who is actively speaking.

Current methods for modifying the video interface during web conferencing may highlight the person actively speaking, however, there may be additional opportunities to leverage contextual data to create an optimized and/or dynamic interface which may highlight specific participants and not just the active speaker.

Therefore, it may be advantageous to, among other things, access data for a scheduled web conference, generate a visual display template for each of a plurality of participants of the scheduled web conference, monitor the scheduled web conference, and adjust the visual display template for at least a portion of the plurality of participants during the scheduled web conference.

According to at least one embodiment, the present invention may improve video conferencing by generating a visual display template for each of the plurality of participants of the scheduled web conference which may engage a viewing participant based on temporal and/or timeline attribution.

According to at least one embodiment, the present invention may improve video conferencing by monitoring the scheduled web conference and adjusting the visual display template for at least a portion of the plurality of participants based on real time relevance scores based on at least one or more of a time alignment, contextual alignment, or a viewing participant's network which may be derived using one or more linguistic analysis techniques to analyze data for the scheduled web conference which may include organizational information, invite information, historical calendar data, scheduled web conference data, user profile data, and/or additional data gathered from one or more integrated software applications.

According to at least one embodiment, the present invention may improve video conferencing by adjusting the prominence of the visual representations corresponding to the plurality of participants within the visual display template.

According to at least one embodiment, the present invention may improve video conference monitoring by monitoring a scheduled web conference in real time using a time series deep learning model trained using historical calendar data to identify task duration patterns and provide one or more recommendations based on the task duration patterns identified.

According to at least one embodiment, the present invention may improve video conferencing by monitoring a scheduled web conference in real time using a time series deep learning model and identifying transitions within an agenda to be used in adjusting the visual display template.

According to at least one embodiment, the present invention may improve video conferencing by utilizing a visual display template to integrate contextual information and/or user specific data which may presented to the plurality of participants such that the video conference user interface may be dynamically modified to emphasize speakers, participants, and relevant user information for an improved video conference experience.

Referring to FIG. 1, Computing environment 100 contains an example of an environment for the execution of at least some of the computer code involved in performing the inventive methods, such as for video conference optimization by leveraging contextual data to generate a visual display template which may be dynamically adjusted to highlight specific participants using the video conference optimization module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the computer environment 100 may use the video conference optimization module 150 to leverage contextual data to generate a visual display template which may be dynamically adjusted to highlight specific participants. The video conference optimization method is explained in more detail below with respect to FIG. 2.

Figure 2:
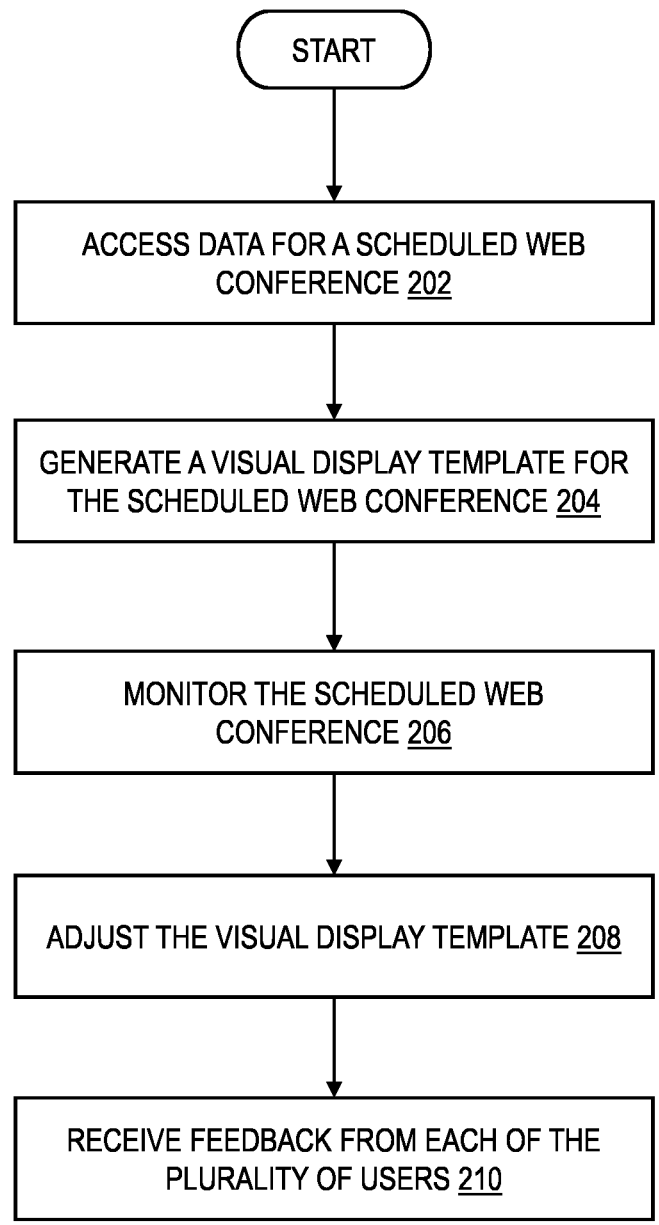
FIG. 2 is an operational flowchart illustrating a process for video conference optimization according to at least one embodiment.

Referring now to FIG. 2, an operational flowchart illustrating the exemplary video conference optimization process 200 used by the video conference optimization module 150 according to at least one embodiment is depicted.

At 202, the video conference optimization module 150 accesses data for a scheduled web conference. The scheduled web conference may be between a plurality of users belonging to an organization. The organization may be a business entity, a non-profit organization, an educational institution, or any other organization comprised of a plurality of users (e.g., employees, volunteers, students) in which meetings between users may be scheduled. The video conference optimization module 150 may access data for the scheduled web conference when a user within the organization creates an invite.

The organization and/or an authorized party representing the organization may opt-in to the video conference optimization 150 prior to the conference optimization module 150 accessing and/or receiving data for the organization. Alternatively, and/or additionally, each of the plurality of users may opt-in to the video conference optimization module 150 prior to the conference optimization module 150 accessing and/or receiving data specific to each of the plurality of users. The video conference optimization module 150 may not access and/or receive data in violation of any law with respect to privacy protection. The organization and/or each of the plurality of users may opt-in to the video conference optimization module 150 within a video conference user interface. The video conference user interface may be displayed by the video conference optimization module 150 in at least in an internet browser, dedicated software application, and/or as an integration with a third party software application. In an embodiment, the video conference optimization module 150 may integrate the video conference optimization software with a third party video conferencing application, an email platform utilized by the organization, a direct messaging platform utilized by the organization, and/or other software applications utilized by the plurality of users of the organization in communicating and/or scheduling web conferences.

Data for the scheduled web conference may include, but is not limited to including, organizational information, invite information, historical calendar data, scheduled web conference data, user profile data, and/or additional data gathered from the one or more integrated software applications. All data received and/or accessed by the video conference optimization module 150 shall not be construed as to violate or encourage the violation of any local, state, federal, or international law with respect to privacy protection. The organization and/or the plurality of users may be able to monitor any data being shared and/or revoke access to specific data at any time within the video conference user interface. Organizational information may include, but is not limited to including, internal documentation, an organizational directory, a management chain, job descriptions, employee titles, user profiles, amongst other organizational information. The invite information may include, but is not limited to including, ad-hoc attendees, carbon copied recipients, required recipients, optional recipients, the agenda for the scheduled web conference, amongst other information included in the invite created by the user within the organization. The historical calendar data may be comprised of data with respect to a plurality of previously conducted meetings, including, but not limited to including, prior meeting minutes, meeting transcripts, invite records, attendance records, length of meetings, meeting times, meeting subjects or descriptions, prior meeting agendas, whether the meeting is a recurring or one time meeting, chat discussions, amongst other historical calendar data. The scheduled web conference data may include, but is not limited to including, an agenda for the scheduled web conference a recipient list of the scheduled web conference, amongst other information. The agenda for the scheduled web conference may include information such as, but not limited to, an agenda timeline, an agenda description, amongst other information relating to the scheduled web conference. The user profile data may be data provided by the user in a user profile. As will be explained in more detail below, the video conference optimization module 150 may utilize one or more linguistic analysis techniques and/or hierarchal analysis techniques is analyzing the data accessed and/or received for the scheduled meeting. The video conference optimization module 150 may utilize the data accessed and/or received as well as insights from the analysis in further populating the user profiles for each of the plurality of users, providing prompts to the user within the web conference user interface, and/or confirming other user profile information. The data for the scheduled web conference may be stored in a knowledge corpus (e.g., database 130) and utilized by the video conference optimization module 150 in at least, generating a visual display template, monitoring the scheduled web conference, providing one or more recommendations to the participants, adjusting the visual display template, and storing feedback received from the plurality of participants, amongst other uses.

The one or more linguistic analysis techniques utilized by the video conference optimization module 150 in analyzing the data accessed and/or received for the scheduled meeting may include linguistic analysis techniques such as, but not limited to, a machine learning model with Natural Language Processing (NLP), speech-to-text, Hidden markov models (HMM), N-grams, Speaker Diarization (SD), Semantic Textual Similarity (STS), Keyword Extraction, amongst other linguistic techniques, such as those implemented in IBM Watson® (IBM Watson and all Watson-based trademarks are trademarks or registered trademarks of International Business Machines Corporation in the United States, and/or other countries), IBM Watson® Speech to Text, IBM Watson® Tone Analyzer, IBM Watson® Natural Language Understanding, IBM Watson® Natural Language Classifier, amongst other linguistic analysis techniques which may be utilized by the video conference optimization module 150. The video conference optimization module 150 may utilize the one or more linguistic analysis techniques in deriving core concepts for the scheduled web conference, retrieving user profiles associated with the invite, understanding timeline information, and levels of participant expertise, amongst other analysis which will be described in more detail below.

The one or more hierarchal analysis techniques which may be utilized by the video conference optimization module 150 in analyzing the data accessed and/or received for the scheduled meeting may include hierarchal analysis techniques, such as, but not limited to, the Galton-Watson branching process, the Lightweight Directory Access Protocol (LDAP), amongst other hierarchal analysis techniques which may be utilized in understanding roles and/or connections between the plurality of users within the organization. In an embodiment, the video conference optimization module 150 may utilize the one or more hierarchal analysis techniques and the one or more linguistic analysis techniques in generating an organizational structure of the organization. The organizational structure may illustrate a position of the plurality of users relative to one another within the organization in the form of a directory information tree (DIT) and/or a Lightweight Directory Access Protocol (LDAP) which may utilize the DIT as a fundamental data structure.

The video conference optimization module 150 may utilize the data accessed and/or received as well as any insights gained from the analysis of the data using at least the techniques described above in further populating the user profiles for each of the plurality of users. In an embodiment the video conference optimization module 150 may utilize prompts and/or generate information fields to add additional information to the user profiles and/or confirm information derived from the data with respect to the plurality of users. For example, the video conference optimization module 150 may present the user with one or more prompts based on the hierarchal analysis asking a user to confirm a team the user is a part of, roles of the members within the user's team, amongst other details. In another example, the video conference optimization module 150 may present the user with one or more prompts based on the linguistic analysis of the data received and/or accessed. The video conference optimization module 150 may present one or more prompts to learn one or more subject matter expertise's of each of the plurality of users. The video conference optimization module 150 may generate a subject matter expertise score for a plurality of topic and/or subtopics based on at least the linguistic analysis and/or feedback provided by the user to the one or more prompts. As will be explained in more detail below, the video conference optimization module 150 may detect topics being discussed within the scheduled meeting and modify the size of participants within the video conference user interface to reflect the user's expertise in the topic being discussed.

As will be explained in more detail below, the data accessed and/or received for the scheduled meeting as well as the analysis of that data may be utilized by the video conference optimization module 150 in integrating contextual information and/or user specific data into the display presented to the plurality of participants of the scheduled meeting such that the video conference user interface may be dynamically modified to emphasize speakers, participants, and relevant user information for an improved video conference experience.

At 204, the video conference optimization module 150 generates a visual display template for the scheduled web conference. The video conference optimization module 150 may generate the visual display template based on the analysis of the scheduled web conference data described above, which may include, but is not limited to including, organizational information, historical calendar data, scheduled web conference data, user profile data, and/or additional data gathered from the one or more integrated software applications.

The visual display template may be comprised of visual representations corresponding to a plurality of participants of the scheduled web conference. The plurality of the participants may include at least a portion of the plurality of users within the organization and/or other participants. The other participants may include a general public audience, guest speakers, and/or amongst other participants which may attend the scheduled meeting. The visual display template may be displayed by the video conference optimization module 150 and may include participant groupings based on teams, presenters, squads, workstreams, focus areas, location, amongst other factors derived based on the scheduled meeting data analysis performed at step 202. The video conference optimization module 150 may utilize avatars grouped by team which may be organized in order of speaking based on the agenda. The visual display template may also utilize sequential ordering and/or grouping based on each of the plurality of participant's roles, responsibilities, hierarchy, and/or representation which may be generated based on the hierarchal analysis performed at step 202. The visual display template generated and displayed to each of the plurality of participants by the video conference optimization module 150 in the video conference user interface may be unique.

For example, Organization A may be presenting a preliminary solution design to Client B including use cases and specific problems faced in the marketplace. There are 5 use cases which have each been assigned to a different team. Teams 1-5 will each be presenting on a different use case including the root cause of the specific problem and the solution design that includes the process transformation and/or technology modernization designed to address the specific problem. Each of the 5 teams are set within the agenda to present for 10 minutes during the scheduled meeting. With such a large group of participants it may be difficult to understand who is who, what their focus is, what team each participant is a member of, what part of the meeting each team is leading, and how the agenda may flow across participants. However, in this example, the video conference optimization module 150 generates a visual display template including dynamically generated User Interface enhancements within the scheduled web conference which organize each participant to their respective groups (i.e., Team 1, Team 2, Team 3, Team 4, Team 5, other Organization A participants, and Client B participants), display participant icons and/or avatars together within each of their respective groups in a sequential order depicting how the teams will present and the participants who will present within each respective group. Furthermore, additional contextual information derived from each of the participant's user profiles may be utilized in providing additional information to the Client B participants to improve communications and the interactions such that the preliminary solution designs presented by each team may be communicated clearly with the aid of the visual display template presented within the video conference user interface.

The user interface enhancements within the visual display template may at least organize each of the participants into their respective groups, include a participant icon and/or avatar together in sequential order reflecting an order in which the respective groups may be presenting based on the agenda, incorporate visual cues, and/or include additional contextual information, amongst other user interface enhancements to communicate information visually to the plurality of participants of the scheduled web conference.

Continuing with the above example, the video conference optimization module 150 visual cues within the visual display template in providing additional contextual information to the Client B participants with respect to a participant presenting. The video conference optimization module 150 may utilize visual cues such as different colors and/or the size of a participant's avatar in providing the additional contextual information. Additionally, the video conference optimization module 150 may enable the Client B participants to manually select a participant from the visual display template within the video conference user interface and provide the Client B participant additional contextual information based on the selection, such as, qualifications, accomplishments, expertise credentials, amongst other information which may be derived from the corresponding user profile.

In an embodiment, the video conference optimization module 150 may generate a relevance score for each of the participants of the scheduled web conference, wherein the relevance score is captured based on a temporal and/or contextual option of the scheduled web conference. The relevance score may be determined by the video conference optimization module 150 using the one or more linguistic analysis techniques described above with respect to step 202, such as, for example, the machine learning model with Natural Language Processing (NLP), Semantic Textual Similarity (STS), Keyword Extraction, amongst other linguistic analysis techniques which may be implemented using IBM Watson® (IBM Watson and all Watson-based trademarks are trademarks or registered trademarks of International Business Machines Corporation in the United States, and/or other countries), IBM Watson® Speech to Text, IBM Watson® Tone Analyzer, IBM Watson® Natural Language Understanding, IBM Watson® Natural Language Classifier, amongst other linguistic analysis techniques which may be utilized in analyzing the plurality of participant's user profiles, historical calendar data, communications between users on the one or more integrated software applications, the scheduled web conference invite and corresponding agenda, amongst other data for the scheduled web conference permissioned by the organization and/or the plurality of users. The relevance score generated by the video conference optimization module is based on at least one or more of, a time alignment, a contextual alignment, and/or a viewing participant's network. The relevance score for time alignment may be based on the expected speakers at a given time period as derived from the agenda, time alignment may be boxed, for example, from Time A to Time B, meaning a temporal window within time. The time alignment may also involve counting up from a specific point in time or counting down from a specific point in time which pertain to a contextual alignment. The relevance score for contextual alignment may be derived based on at least topic analysis and/or background analysis of the expected speakers and/or an analysis of the discussion using the one or more linguistic analysis techniques described above. The relevance score for the participant's network may be based on at least the hierarchal analysis performed at step 202 and/or communication frequency. For example, a participant's network may affect the visual display template such that the other participant and/or speaker may be highlighted within the video conference user interface because the other participant and/or speaker may be an individual the participant reports to and/or communicates frequently with. In this embodiment, the visual display template may highlight and/or promote the prominence of other participants to the viewing participant based on the relevance score generated. The video conference optimization module 150 may determine the relevance score live and dynamically update the relevance score for each of the plurality of participants relative to the other participants throughout the scheduled web conference. The video conference optimization module 150 may dynamically update the relevance score based on real time discussions between the participants which may enable participants such as, but not limited to, guest speakers and/or participants outside the organization to increase their relevance score relative to the other participants and accordingly increase their prominence to be reflected in the visual display template. As will be explained in more detail below, the visual display template presented to each of the plurality of participants within the video conference user interface may be adjusted according to the relevance score being generated, the topic being discussed, and/or the current speaker.

The visual display template generated for the scheduled web conference may be designed to capture a host's desired influencing factors. The host's desired influencing factors may include at least temporal influencing factors and/or contextual influencing factors.

At 206, the video conference optimization module 150 monitors the scheduled web conference. The video conference optimization module 150 may monitor topics being discussed in relation to the agenda and/or the one or more speakers for the scheduled web conference. As will be described in more detail below, the video conference optimization module 150 may monitor the scheduled web conference to identify transitions within the agenda which may be utilized in adjusting the visual display template.

The video conference optimization module 150 may monitor the scheduled web conference utilizing at least the one or more linguistic analysis techniques described at step 202. The video conference optimization module 150 may utilize the one or more linguistic analysis techniques, such as, speech-to-text, in generating a real time transcript of the scheduled web conference and utilize Keyword Extraction in detecting topics being discussed within the scheduled web conference. The video conference optimization module 150 may utilize at least the real time transcript, the participants currently leading a discussion, and the agenda for the scheduled web conference in identifying upcoming transitions within the agenda. As will be explained in more detail below at step 208, as the video conference optimization module 150 identifies upcoming transitions within the agenda the video conference optimization module 150 may adjust the visual display template such that the prominence of a next speaker may be increased relative to the prominence of the current speaker. The video conference optimization module 150 may utilize one or more visual cues within the visual display template in adjusting the prominence of the one or more participants. For example, the video conference optimization module 150 may adjust the colors of the next speakers within the sequentially ordered list to signal a transition. In another example, the video conference optimization module 150 may gradually reduce the size of a current speaker's avatar and gradually increase the size of a next speaker's avatar to signal the transition.

The video conference optimization module 150 may also utilize the real time chat transcript and/or the one or more linguistic analysis techniques described at step 202 in identifying one or more of the plurality of participants with subject matter expertise in the topics being discussed. In at least one embodiment, the one or more linguistic analysis techniques utilized in identifying the participants with subject matter expertise may include Natural Language Processing Association such as, but not limited to, Word2Vec, cosine similarity, and/or association to keywords identified within one or more of the participant's user profiles. The video conference optimization module 150 may utilize one or more visual cues within the visual display template in increasing the prominence of the one or more participants with subject matter expertise in the topics being discussed. The video conference optimization module 150 may adjust the prominence proportionally based on a level of subject matter expertise derived from the information included in a user profile, such as, qualifications, accomplishments, expertise credentials, amongst other information which may be included in a user profile. For example, during the scheduled web conference the video conference optimization may determine based on the real time chat transcript and the agenda that blockchain is currently being discussed. Accordingly, the video conference optimization module 150 may identify Participant 1, Participant 2, and Participant 3, based on their user profiles as having subject matter expertise in blockchain. Based on their user profiles the video conference optimization module 150 may determine that Participant 1 has the highest level of expertise followed by Participant 2 and Participant 3. The video conference optimization module 150 may adjust the visual display template such that Participant 1's avatar is larger than Participant 2 and 3's avatars which are larger than the avatars of the remaining plurality of participants.

In an embodiment, the video conference optimization module 150 may also monitor the scheduled web conference in order to provide one or more recommendations to the plurality of participants. For example, the video conference optimization module 150 may provide timing warnings within the video conference user interface of the participants currently presenting if the video conference optimization module 150 determines the participants currently presenting may exceed their allotted time from the agenda.

The video conference optimization module 150 may also utilize one or more machine learning models in monitoring the scheduled web conference. The video conference optimization module 150 may train the one or more machine learning models based on at least the historical calendar data gathered at step 202, which may include, but not limited to including, prior meeting minutes, meeting transcripts, invite records, attendance records, length of meetings, meeting times, meeting subjects or descriptions, prior meeting agendas, whether the meeting is a recurring or one time meeting, chat discussions, amongst other historical calendar data. The one or more machine learning models may be trained to identify scheduled web conference duration patterns which may be specific to particular types of meetings, topics, and/or particular participants such that the video conference optimization module 150 may be better able to understand the likely progression of a scheduled meeting based on the type of meetings, topics on the agenda, and participants scheduled to present. For example, the video conference optimization module 150 may determine that the Chief Executive Officer of the organization is likely to exceed their allotted time during the Quarterly Results scheduled web conference based on past similar meetings.

The one or more machine learning models utilized by the video conference optimization module 150 may include a time series deep learning model. The time series deep learning model may be a time sequence prediction model (e.g., RNN (Recurrent Neural Network), LSTM (Long short-term memory), CNN (Convolutional Neural Network), TCN (Temporal Convolutional Networks), ED-TCN (Encoder-Decoder Temporal Convolutional Network)). In at least one embodiment, the time sequence prediction model may be a RNN and/or a LSTM, a RNN may be a type of neural network which may be well-suited to time series data and an LSTM may be an artificial RNN architecture utilized in the field of deep learning which may classify, process, and/or make predictions based on time series data. The video conference optimization module 150 may train the RNN and/or LSTM based on at least the historical calendar data to identify task duration patterns which may be utilized by the video conference optimization module in at least monitoring the scheduled web conference and/or providing one or more recommendations to the plurality of users based on real time progress of the scheduled web conference as compared to the agenda.

At 208, the video conference optimization module 150 adjusts the visual display template for the scheduled web conference. The video conference optimization module 150 may adjust the visual display template for at least a portion of the of participants during the scheduled web conference. The video conference optimization module 150 may adjust the visual display template for the scheduled web conference in real time as the participants transition through the topics of the agenda.

The video conference optimization module 150 may identify transitions within the scheduled web conference corresponding to the agenda by monitoring the scheduled web conference utilizing the one or more linguistic analysis techniques and/or the time series deep learning model described in detail above at step 206. The video conference optimization module 150 may utilize one or more visual cues to adjust the visual display template presented to each of the plurality of users within the video conference user interface. The adjustments to the visual display template may be different for each of the plurality of participants and/or participant groupings of the scheduled meeting, the participant groupings may be based on at least, teams, presenters, squads, workstreams, focus areas, location, amongst other factors derived based on the scheduled meeting data analysis performed at step 202. For example, the video conference optimization module 150 may adjust the visual display for each of the participants in a group currently presenting such that their video conference user interface includes a countdown clock depicting the amount of time the group has remaining for their presentation based on the agenda. In this example, the countdown clock may not be presented within the video conference user interface of the other participants, however, the video conference optimization module 150 may adjust the visual display template for the other participants by gradually reducing the prominence of the avatars for the group presenting and simultaneously increasing the prominence of the avatars of the group presenting next according to the agenda. Additionally, the video conference optimization module 150 may initiate the availability of the additional contextual information for the group presenting next such that participants may be able to begin to orientate themselves with the user profile information for each of the participants in the group presenting next.

In an embodiment, the video conference optimization module 150 may automatically adjust the visual display template for the scheduled web conference based on the agenda. In this embodiment, the video conference optimization module 150 may automatically grow or shrink the video window within the visual display template for each participant in sequence such that the time allotted for the scheduled meeting may be divided amongst all of the participants enabling each participant to contribute. In this embodiment, each participant may be able to end their participation early using options displayed to the user within the video conference user interface, here, the video conference optimization module 150 may adjust the time for each of the remaining participants and/or remove the remaining time from the time allotted to the scheduled web conference.

In an embodiment, the video conference optimization module 150 may adjust the visual display template for each of the participants based on the relevance score generated. The relevance score for each of the participants relative to the other participants of the scheduled web conference and may be adjusted in real time based on changes within the time alignment, the contextual alignment, and/or the viewing participant's network. As the relevance score is updated the visual display template is adjusted for the viewing participants to highlight and/or increase the prominence of other participants with the highest relevance scores. In this embodiment, the video conference optimization module 150 may reset the relevance scores generated as the video conference optimization module 150 identifies transitions within the agenda such that the relevance score may be generated on a per topic basis, per speaker basis, or per presentation basis.

Additionally, as will be explained in more detail below with respect to step 210, the visual display templates of each of the plurality of participants may be unique based on manually set user preferences which may be adjusted by the plurality of participants in their user profile.

At 210, the video conference optimization module 150 receives feedback from each of the plurality of participants. The video conference optimization module may receive feedback from each of the plurality of participants in the video conference user interface. The video conference optimization module 150 may receive feedback in response to one or more feedback prompts presented to each of the plurality of participants.

The feedback received from the participants may include numerical ratings, textual feedback, amongst other feedback which may be received and analyzed by the video conference optimization module 150 using at least the linguistic analysis techniques described above. The video conference optimization module 150 may store the feedback received from each of the plurality of participants in the knowledge corpus (e.g., database 130). The knowledge corpus (e.g., database 130) may be comprised of a plurality of personal knowledge corpora corresponding to each of the plurality of participants. The video conference optimization module 150 may utilize the feedback in both improving the visual display template generally and/or specific improvements for specific participants. Additionally, each of the participants and/or users within the organizations may be able to customize future visual display templates generated by the video conference optimization module 150 by adjusting the user preferences within their respective user profile. For example, a user may enable the real-time chat transcript to be a permanent fixture within their visual display template.

Additionally, users may enable participant speaking alerts and/or topic alerts for scheduled web conferences such that the user may receive a notification that a specific user is presenting and/or a topic is being discussed within in a scheduled web conference in which they may not be an active participant. The user may receive the notification and/or direct link through one or more integrated software applications and/or the third party conferencing application utilizing the video conference optimization module 150.

In an embodiment, after the completion of the scheduled web conference, a recording, transcript, agenda, additional historical calendar, and/or other completed web conference data may be stored in the knowledge corpus (e.g., database 130). The video conference optimization module 150 may utilize the completed web conference data stored in the knowledge corpus (e.g., database 130) in retraining the time series deep learning model. As additional scheduled web conferences are completed the time series deep learning model may learn patterns for particular types of meetings, topics, and/or particular participants which may improve identification of transitions within the agenda which may be utilized in improved adjustments to the visual display template and more accurate recommendations.

The video conference optimization module 150 may be utilized in by the organization in creating more accurate agendas for future scheduled web conferences. A user within the organization may be able to input a proposed agenda for a future scheduled web conference within the video conference user interface which may be analyzed using the one or more linguistic analysis techniques and/or the time series deep learning model which may output an alternative agenda based on scheduled web conference duration patterns specific to the type of meeting, topics, and/or particular participants of the future scheduled web conference such that time may be allocated accurately and efficiently.

In an embodiment, each of the participants may be provided with a meeting summary. The meeting summary may be generated by the video conference optimization module 150 and provide highlights from the scheduled web conference. The meeting summary may also include time stamps corresponding to the agenda topics which may enable the participants to efficiently reference particular discussions within the recording of the scheduled web conference.

It may be appreciated that FIG. 2 provides only an illustration of one embodiment and do not imply any limitations with regard to how different embodiments may be implemented. Many modifications to the depicted embodiment(s) may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of one or more transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for video conference optimization, the method comprising:
   accessing data for a scheduled web conference, including at least an agenda;
   generating a visual display template for each of a plurality of participants of the scheduled web conference;
   monitoring the scheduled web conference using a time series deep learning model trained using historical calendar data to identify task duration patterns and one or more linguistic analysis techniques to identify upcoming transitions within the agenda based on audio data that includes a discussion between the plurality of participants; and
   adjusting the visual display template for at least a portion of the plurality of participants during the scheduled web conference.

2. The method of claim 1, further comprising:
   storing completed web conference data in a knowledge corpus;
   retraining the time series deep learning model based on the completed web conference data;
   receiving a proposed agenda for a future scheduled web conference;
   analyzing the proposed agenda using the time series deep learning model, wherein the time series deep learning model is retrained based on the completed web conference data; and
   generating an alternative agenda for the future scheduled web conference.

3. The method of claim 1, wherein the visual display template is comprised of visual representations corresponding to the plurality of the participants, wherein a prominence of each of the visual representations corresponds to a relevance score generated for each of the plurality of participants based on a relevance of other participants, wherein the relevance score is determined by a machine learning model with Natural Language Processing which monitors audio data including a discussion between the plurality of participants in the scheduled web conference and dynamically updates the relevance score for each of the plurality of participants based on the discussion in real time, and wherein the relevance of the other participants to each of the plurality of participants is based on at least one or more of, a time alignment, a contextual alignment, or a viewing participant's network.

4. The method of claim 1, wherein the task duration patterns are utilized in understanding a likely progression of the scheduled web conference, and wherein the task duration patterns are specific to at least, one or more of, a meeting type, a topic, and particular participants.

5. The method of claim 1, wherein monitoring the scheduled web conference further comprises:
   providing one or more recommendations to one or more participants during the scheduled web conference using the time series deep learning model based on the task duration patterns identified and a comparison of the agenda for the scheduled web conference and real time progress of the scheduled web conference.

6. The method of claim 1, further comprising:
   receiving feedback from each of the plurality of participants of the scheduled web conference in a video conference user interface; and
   identifying one or more improvements to the visual display template, wherein the one or more improvements may be general improvements for the plurality of participants or specific improvements for one or more specific participants.

7. The method of claim 1, wherein accessing data for the scheduled web conference further comprises:
   displaying one or more prompts to each of the plurality of users, wherein the one or more prompts are generated based on a linguistic analysis and a hierarchal analysis of the data accessed for the scheduled meeting;
   populating a user profile for each of the plurality of participants based on responses received to the one or more prompts and the data accessed for the scheduled meeting;
   generating a subject matter expertise score for a plurality of topics or subtopics for each of the plurality of users, wherein the subject matter expertise scores are utilized in the adjusting of the visual display template for at least the portion of the plurality of participants during the scheduled web conference.

8. The method of claim 7, wherein each of the plurality of participants may access information associated with each of the plurality of participants by selecting an avatar associated with a participant, wherein the information includes at least the subject matter expertise score for the plurality of topics or subtopics of the participant.

9. The method of claim 7, wherein the one or more linguistic analysis techniques include at least Natural Language Processing Association which is utilized to identify participants with a subject matter expertise corresponding to a topic of the discussion in the audio data between the plurality of participants based on a comparison of the topic of discussion with the user profile for each of the plurality of participants.

10. The method of claim 9, wherein adjusting the visual display further comprises:
increasing a prominence at least the portion of the plurality of participants, wherein the portion of the plurality of participant have the subject matter expertise correspond to the topic of discussion based on the subject matter expertise score included in the user profile.

11. The method of claim 1, wherein the one or more linguistic analysis techniques include utilizing speech-to-text to generate a real time transcript of the scheduled web conference and Keyword extraction in detecting topics within the audio data including the discussion between the plurality of participants.

12. The method of claim 1, further comprising:
identifying transitions within the agenda to be used in adjusting the visual display template, wherein the visual display template includes participant icons for each of the plurality of participants, wherein the participant icons are displayed in two or more groups, and wherein the two or more groups are displayed in a sequential order according to an order of derived from the agenda of the scheduled web conference; and
adjusting the visual display template to increase a prominence of a first group of the two or more groups while decreasing the prominence of a second group within the visual display template based on the transitions identified within the agenda.

13. A computer system for video conference optimization, comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
accessing data for a scheduled web conference, including at least an agenda;
generating a visual display template for each of a plurality of participants of the scheduled web conference;
monitoring the scheduled web conference using a time series deep learning model trained using historical calendar data to identify task duration patterns and one or more linguistic analysis techniques to identify upcoming transitions within the agenda based on audio data that includes a discussion between the plurality of participants; and
adjusting the visual display template for at least a portion of the plurality of participants during the scheduled web conference.

14. The computer system of claim 13, further comprising:
program instructions, stored on at least one of the one or more computer-readable tangible storage medium for execution by at least one of the one or more processors via at least one of the one or more computer-readable memories, to store completed web conference data in a knowledge corpus;
program instructions, stored on at least one of the one or more computer-readable tangible storage medium for execution by at least one of the one or more processors via at least one of the one or more computer-readable memories, to retrain the time series deep learning model based on the completed web conference data;
program instructions, stored on at least one of the one or more computer-readable tangible storage medium for execution by at least one of the one or more processors via at least one of the one or more computer-readable memories, to receive a proposed agenda for a future scheduled web conference;
program instructions, stored on at least one of the one or more computer-readable tangible storage medium for execution by at least one of the one or more processors via at least one of the one or more computer-readable memories, to analyze the proposed agenda using the time series deep learning model, wherein the time series deep learning model is retrained based on the completed web conference data; and
program instructions, stored on at least one of the one or more computer-readable tangible storage medium for execution by at least one of the one or more processors via at least one of the one or more computer-readable memories, to generate an alternative agenda for the future scheduled web conference.

15. The computer system of claim 13, wherein the visual display template is comprised of visual representations corresponding to the plurality of the participants, wherein a prominence of each of the visual representations corresponds to a relevance score generated for each of the plurality of participants based on a relevance of other participants, wherein the relevance score is determined by a machine learning model with Natural Language Processing which monitors audio data including a discussion between the plurality of participants in the scheduled web conference and dynamically updates the relevance score for each of the plurality of participants based on the discussion in real time, and wherein the relevance of the other participants to each of the plurality of participants is based on at least one or more of, a time alignment, a contextual alignment, or a viewing participant's network.

16. A computer program product for video conference optimization, comprising:
one or more computer readable storage media, and program instructions collectively stored on the one or more computer readable storage media, the program instructions comprising:
accessing data for a scheduled web conference, including at least an agenda;
generating a visual display template for each of a plurality of participants of the scheduled web conference;
monitoring the scheduled web conference using a time series deep learning model trained using historical calendar data to identify task duration patterns and one or more linguistic analysis techniques to identify upcoming transitions within the agenda based on audio data that includes a discussion between the plurality of participants; and
adjusting the visual display template for at least a portion of the plurality of participants during the scheduled web conference.

17. The computer program product of claim 16, further comprising:

program instructions, stored on at least one of the one or more computer-readable storage media, to store completed web conference data in a knowledge corpus;

program instructions, stored on at least one of the one or more computer-readable storage media, to retrain the time series deep learning model based on the completed web conference data;

program instructions, stored on at least one of the one or more computer-readable storage media, to receive a proposed agenda for a future scheduled web conference;

program instructions, stored on at least one of the one or more computer-readable storage media, to analyze the proposed agenda using the time series deep learning model, wherein the time series deep learning model is retrained based on the completed web conference data; and program instructions, stored on at least one of the one or more computer-readable storage media, to generate an alternative agenda for the future scheduled web conference.

18. The computer program product of claim 16, wherein the visual display template is comprised of visual representations corresponding to the plurality of the participants, wherein a prominence of each of the visual representations corresponds to a relevance score generated for each of the plurality of participants based on a relevance of other participants, wherein the relevance score is determined by a machine learning model with Natural Language Processing which monitors audio data including a discussion between the plurality of participants in the scheduled web conference and dynamically updates the relevance score for each of the plurality of participants based on the discussion in real time, and wherein the relevance of the other participants to each of the plurality of participants is based on at least one or more of, a time alignment, a contextual alignment, or a viewing participant's network.

* * * * *